S. B. GILLILAND.
SELF-RAKE FOR REAPER.
No. 171,010. Patented Dec. 14, 1875.
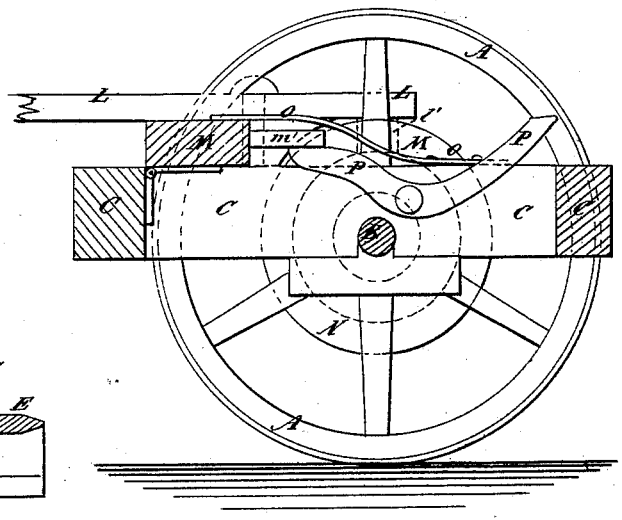
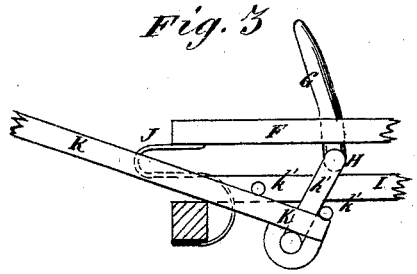
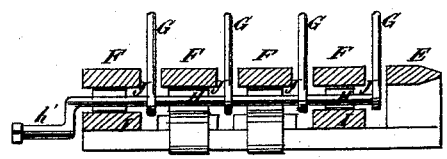
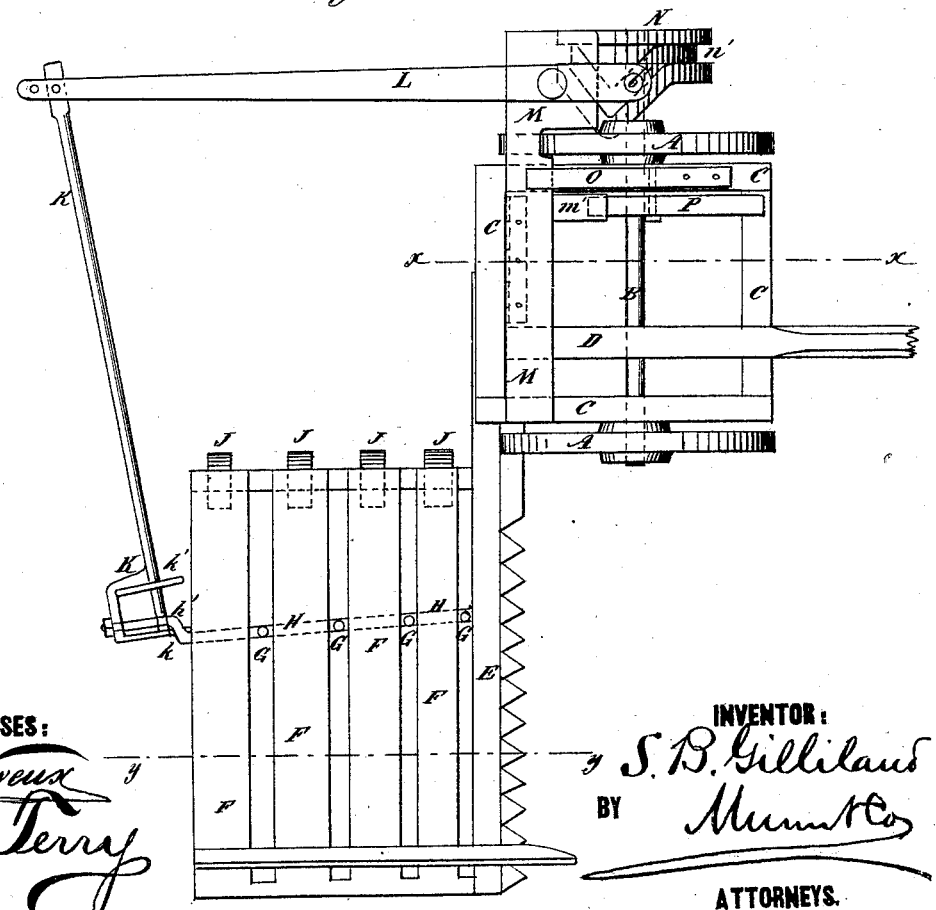

UNITED STATES PATENT OFFICE.

SAMUEL B. GILLILAND, OF SALISBURY, MISSOURI.

IMPROVEMENT IN SELF-RAKES FOR REAPERS.

Specification forming part of Letters Patent No. 171,010, dated December 14, 1875; application filed August 28, 1875.

*To all whom it may concern:*

Be it known that I, SAMUEL B. GILLILAND, of Salisbury, in the county of Chariton and State of Missouri, have invented a new and useful Improvement in Self-Rake for Reapers, of which the following is a specification:

Figure 1 is a vertical section of my improved machine, taken through the line $x\, x$, Fig. 2. Fig. 2 is a top view of the same. Fig. 3 is a detail rear view of the inner part of the apron or platform of the same. Fig. 4 is a detail cross-section of the platform or apron, taken through the line $y\, y$, Fig. 2.

Similar letters of reference indicate corresponding parts.

The object of this invention is to furnish an improved self-rake for reapers, which shall be simple in construction, inexpensive in manufacture, and effective in operation, running very light, and doing its work well.

A are the drive-wheels, which are attached to the axle B. The axle B revolves in bearings attached to the frame C, to which is attached the tongue D. E is the finger-bar, which is connected with the rear part of the frame C in the usual way, and with which is connected the apron or platform F. The platform F is slotted transversely to receive the rake-teeth G, which are attached to a rod, bar, or head, H. The rake-head H slides upon guides I, attached to the lower side of the platform F. The inner ends of the strips of the platform F are supported by bent metallic straps J, the bends of which project beyond the inner edge of the platform F, as shown in Figs. 2 and 3, so that the rake-head may pass into said bends, to cause the rake to sweep the cut grain entirely off the said platform F. Upon the rear end of the rake-head H, which projects in the rear of the platform F, is formed a crank, $h'$, which works in bearings in the end of the pitman K, and which is so formed that when the rake G H is pushed outward by the outward movement of the pitman K, the teeth G will be turned down beneath the platform F, so as to pass beneath the cut grain lying upon said platform without disturbing it, and that when the rake G H is drawn inward by the inward movement of the pitman K, the teeth G may be turned up, so as to sweep the cut grain from the platform.

The play of the crank $h'$, and consequently the movement of the teeth G, is limited by two stops, $k'$, attached to the pitman K, and against which the crank $h'$ strikes. The other end of the pitman K is pivoted to the rear end of the lever L, which is pivoted to the end of a bar, M, and to its end is attached a pin, $l'$. The pin $l'$ enters a groove, $n'$, in a wheel, N, rigidly attached to the end of the axle B. The groove $n'$ is made with a V-shaped bend upon one side of the wheel N, and the rest of said groove passes around at right angles with the axis of said wheel.

By this construction, as the pin $l'$ passes along the forward incline of the V in the groove $n'$, the lever L will be operated to draw the rake G H inward and sweep the cut grain from the platform F, and as the said pin moves along the rear incline of said groove the lever L will be operated to push the rake G H to the outer part of said platform ready for the next stroke. The bar M is hinged at its rear edge to the rear part of the frame C, so that by turning its forward edge upward the pin $l'$ of the lever L may be thrown out of gear with the groove $n'$ of the wheel N. The bar M is held down to hold the lever L in gear with the wheel N by a spring, O, attached to the frame C, and which rests upon the upper side of the forward edge of the said bar M. The bar M is raised to throw the lever L out of gear with the wheel N by the foot-lever P, pivoted to the frame C, and which operates upon the lower side of an arm, $m'$, rigidly attached to the said bar M.

Having thus described my invention, I claim as new and desire to secure by Letters Patent—

The combination of the rake G H, the pitman K, and the lever L with the slotted platform F, and with the grooved wheel N, attached to the axle B, substantially as herein shown and described.

SAMUEL B. GILLILAND.

Witnesses:
 ELI WAYLAND,
 THEO. NEWBOLD.